E. B. McCARTNEY.
MOUNTING FOR TRACTION DRIVE WHEELS.
APPLICATION FILED APR. 26, 1920.
1,418,948.
Patented June 6, 1922.
3 SHEETS—SHEET 1.
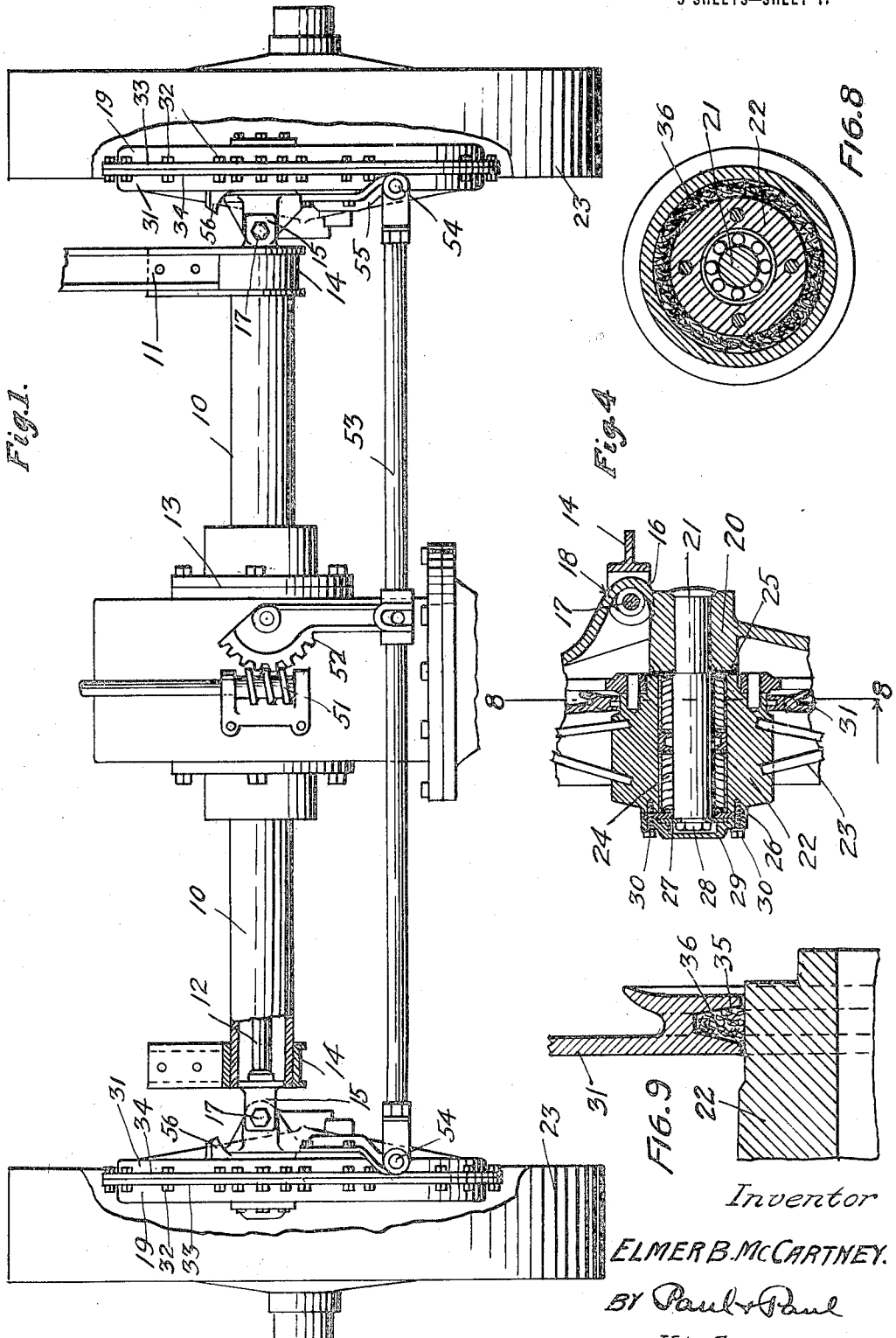
Inventor
ELMER B. McCARTNEY.
BY Paul & Paul
His Attorneys.

E. B. McCARTNEY.
MOUNTING FOR TRACTION DRIVE WHEELS.
APPLICATION FILED APR. 26, 1920.
1,418,948.
Patented June 6, 1922.
3 SHEETS—SHEET 2.
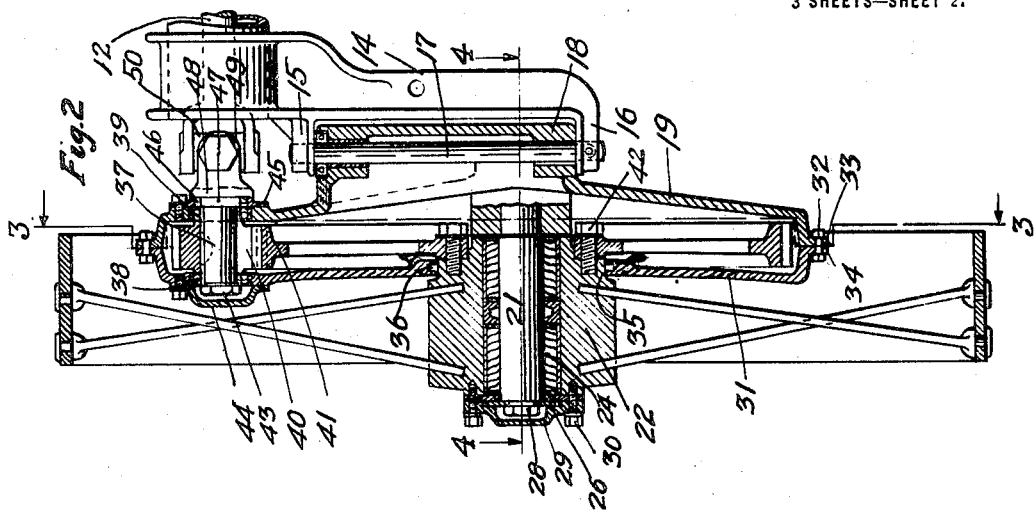
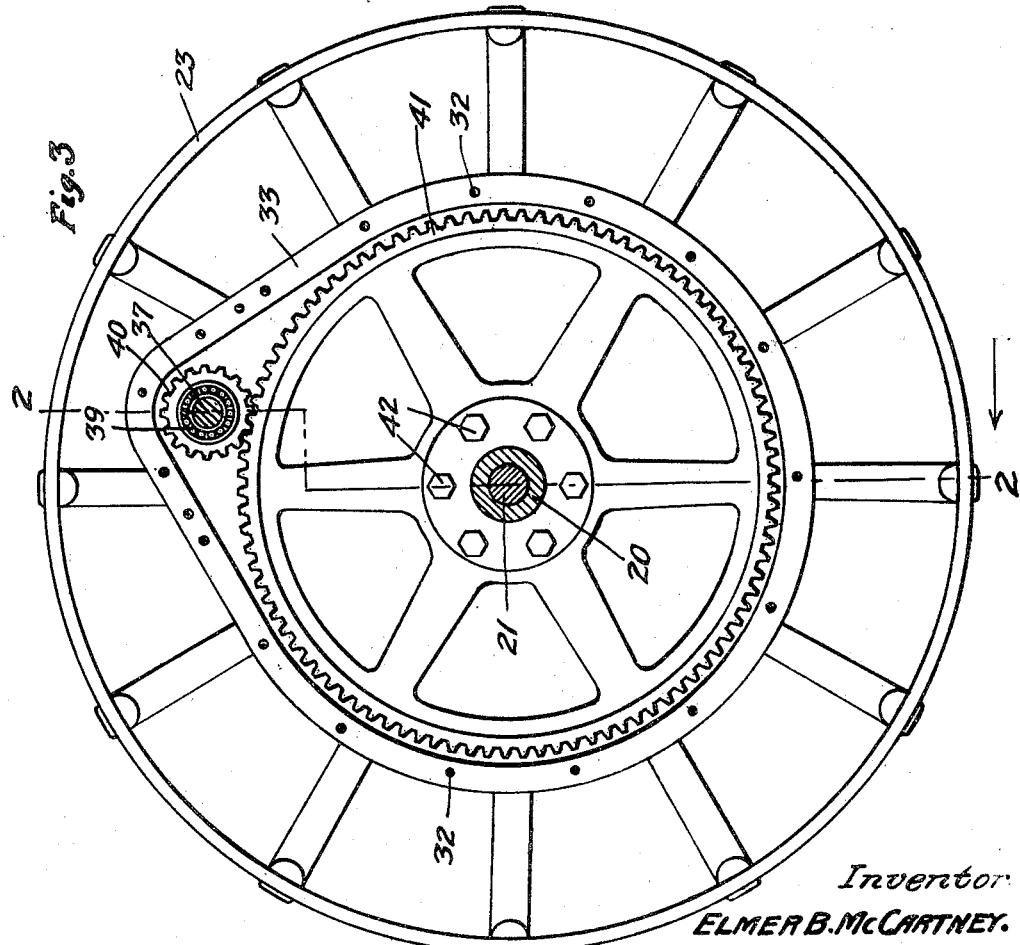
Inventor
ELMER B. McCARTNEY.
By Paul & Paul
His Attorneys.

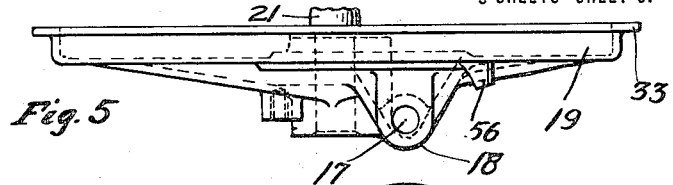
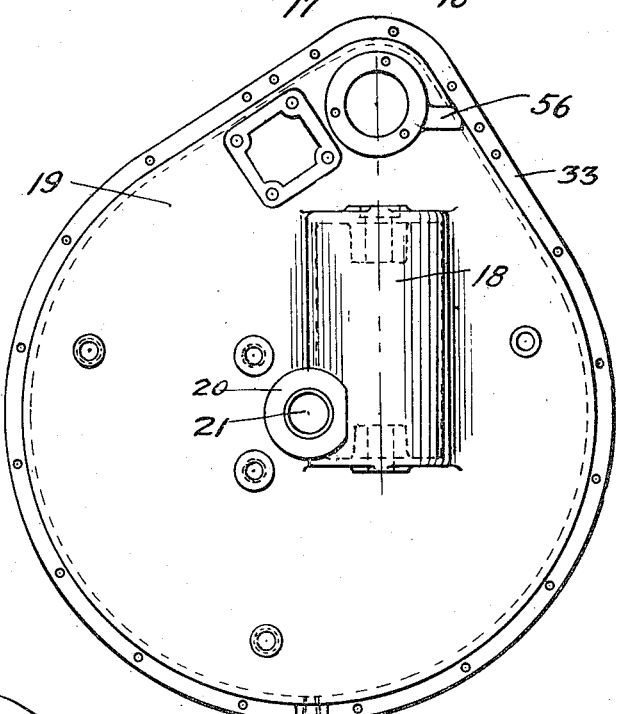
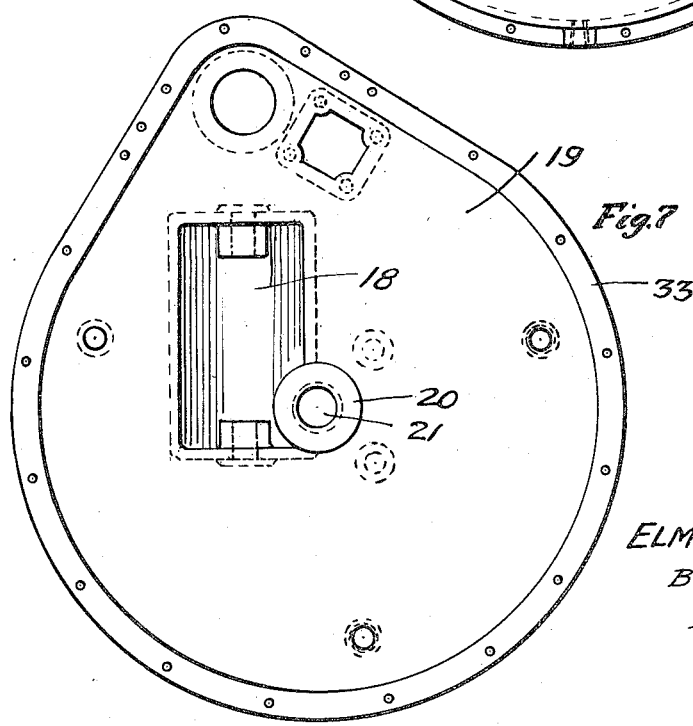

UNITED STATES PATENT OFFICE.

ELMER B. McCARTNEY, OF MINNEAPOLIS, MINNESOTA, ASSIGNOR TO TORO MOTOR COMPANY, OF MINNEAPOLIS, MINNESOTA, A CORPORATION OF MINNESOTA.

MOUNTING FOR TRACTION DRIVE WHEELS.

1,418,948. Specification of Letters Patent. Patented June 6, 1922.

Application filed April 26, 1920. Serial No. 376,635.

*To all whom it may concern:*

Be it known that I, ELMER B. MCCARTNEY, a citizen of the United States, resident of Minneapolis, county of Hennepin, State of Minnesota, have invented certain new and useful Improvements in Mountings for Traction Drive Wheels, of which the following is a specification.

My invention relates in general to the mounting and driving of tractor vehicle wheels and, particularly, to such drive wheels which also constitute the steering wheels of motor driven vehicles.

The object of my invention is to provide an improved mounting for traction drive wheels.

A more specific object of the invention is to provide a simple, rigid, oil-tight casing, composed of two members enclosing the driving gears, one member thereof having the rear axle upon which the drive wheel is mounted rigidly secured thereto, the same member also forming one part of the steering knuckle and in conjunction with the other casing members, also carrying the jack shaft for driving the wheel.

A further object is to provide an oil-tight gear-casing of this class which shall have only one exposed running joint between the wheel and the casing and wherein this joint shall be of the smallest practical diameter close to the wheel axle.

My invention consists in certain constructions and combinations as hereinafter described and particularly pointed out in the claims, reference being had to the accompanying drawings in which—

Figure 1 is a plan view partly in section of a pair of drive wheels and steering device therefor having my invention applied thereto.

Figure 2 is a central vertical section, broken away on the irregular line 2—2 of Figure 3, of one of the drive and steering wheels.

Figure 3 is a sectional view taken on the line 3—3 of Figures 2 between the two members of the gear casing.

Figure 4 is a plan sectional view on the line 4—4 of Figure 2.

Figure 5 is a plan view of the main or steering member of the casing.

Figures 6 and 7 are respective front and rear views of the same member of the casing.

Figure 8 is a section on the line 8—8 of Figure 4.

Figure 9 is a detail view of the oil channel.

In the drawings (Figure 1) 10 is the hollow supporting axle for the vehicle or tractor frame 11, through which passes the power transmitting shafts 12, driven through a differential or other gearing (not shown) in a casing 13 supported on the axle 10. This axle carries the depending knuckle arms 14, having the forks 15 and 16 between which is pivotally supported, upon a pin 17, the knuckle lug 18 integrally connected to the supporting casing member 19. Referring to Figure 4, this member 19 is provided with a central hub 20 in which is rigidly secured the stub axle 21 upon which the hub 22 of the drive wheel 23 is rotatably mounted preferably on anti-friction or roller bearings 24. The inner end of the bearing cage abuts the hub 20 of the casing 19 at 25 and its outer end abuts a plate 26 fastened to the hub 22 of the wheel. A washer 27, secured to the stub axle 21 by a cap screw 28 tapped into the axle, holds the wheel 23 in place upon the axle. A cap 29, secured to the hub 22 by cap screws 30, encloses the outer end of the bearings and seals them from the entrance of dust or other injurious matter and at the same time prevents the escape of lubricant from the bearings.

As shown particularly in Figures 2, 4 and 5, the knuckle lug 18 and the pin 17 are perpendicular to the driving shaft 12 and are offset laterally from the stub axle 21 to permit of the pin passing the axle when inserted through the forks 15 and 16 and knuckle lug 18. The secondary member or cover 31 of the casing, is secured to the main member 19 by a series of bolts 32 through flanges 33 and 34 of the members 19 and 31 respectively. These flanges, preferably provided with a suitable packing, form a non-rotatable, peripheral, oil-tight joint for the casing. The cover 31 is provided with a central annular opening 35. The inner circular edge of this opening 35 forms a running joint for the hub 22 of the drive wheel 23 and is provided with a peripheral packing groove 36 to prevent the escape of the lubricant in the casing and the entrance of foreign matter thereto. This cover 31 is also provided, on its inner face, with an annular oil channel preferably integrally formed thereon adjacent the opening 35. This oil channel functions to receive oil running down the cover above the hub 22 and thereby to prevent its flow to the hub 22 and to cause the oil to drop from the channel below the hub to the bottom of the casing in the path of the large drive gear 41. A short jack shaft 37 is journaled in ball bearings 38 and 39 in the casing members 19 and 31 in axial alignment with the transmission shaft 12. A pinion 40 is keyed to this shaft and meshes with the large drive gear 41, centered and mounted on the hub 22 of the drive wheel 23 and rigidly connected thereto by cap screws 42. A capped screw 43 tapped into the shaft 37 holds the inner ball race of the bearing 38 against the pinion 40 and a cap or cover plate 44 secured to the cover 31 bears against the outer ball race and seals the bearings from the outside. A plate 45 secured to the casing member 19 bears against the outer ball race of the bearing 39 and is provided with an annular packing ring 46 making packed connection with the shouldered section 47 of the jack shaft 37. The inner ball races of the bearings 38 and 39 and the pinion 40 are clamped firmly against the shoulder of the shaft section 47 by the screw 43. A flange 48 on the shaft 37 covers the packing ring 46 preventing entrance to the bearings of foreign matter from the inner driving side.

The forked end 49 of the jack shaft 37 is perpendicular to the knuckle pin 17 and has driving connections with the forked end of the transmission shaft 12 by means of a universal coupling block 50.

It will be seen that, by having a stub axle for the drive wheel rigidly secured to a gear case member which forms a part of the steering knuckle, and, by providing a universal driving coupling for the drive wheel perpendicular to the steering knuckle, a simple inexpensive construction is effected for mounting the drive wheels. Furthermore, the driving gears are enclosed and at the same time dirigible drive wheels are provided. Any suitable form of steering device may be used such as a worm 51 (Figure 1), a worm wheel sector and arm 52 and connecting rod 53. This rod may be connected direct to the gear casing members 19 at 54 or by brackets 55 as shown in Figure 1 and suitable stop lugs 56 may be provided on the member 19 to limit the turning movements of the drive wheels to the proper degree.

Various modifications may be made in the details of this construction without departing from the principle of the invention and I do not therefor limit myself strictly to the construction as shown.

I claim as my invention:

1. A traction wheel mounting including a gear casing, a supporting axle therefor, a stub axle carried by said casing, a traction wheel rotatably mounted upon said stub axle, with a running joint connection provided between the gear casing and the hub of said wheel, a driven gear mounted in said casing, and secured to said traction wheel, a driving pinion mounted in said casing and meshing with said driven gear, a steering knuckle lug formed integrally with said casing and offset laterally from the stub axle, knuckle-forks carried by the supporting axle and embracing said lug, a vertical pin connecting said forks and said lug, and universal driving connections with said pinion at an angle to the steering knuckle members.

2. A traction wheel mounting including a gear casing by which the wheel is rotatably borne, a supporting axle for the casing, a stub axle carried by said casing, a traction wheel rotatably mounted upon said stub axle, with a running joint connection provided between the gear casing and the hub of said wheel, a driven gear mounted in said casing and secured to said traction wheel, an oil channel annularly formed on the casing interior adjacent the wheel bearing whereby oil flowing down the casing interior is carried around said bearing and dropped upon said gear.

In witness whereof, I have hereunto set my hand this 22d day of April, 1920.

ELMER B. McCARTNEY.